United States Patent

[11] 3,555,253

| | | |
|---|---|---|
| [72] | Inventor | Susumu Seki<br>Kokubunji-shi, Japan |
| [21] | Appl. No. | 617,257 |
| [22] | Filed | Feb. 20, 1967 |
| [45] | Patented | Jan. 12, 1971 |
| [73] | Assignee | Hitachi, Ltd.<br>Tokyo, Japan<br>a corporation of Japan |
| [32] | Priority | Feb. 21, 1966 |
| [33] | | Japan |
| [31] | | 41/10041 |

[54] NUMERICAL CONTROL SYSTEM
5 Claims, 11 Drawing Figs.

[52] U.S. Cl. .................................................. 235/151.11,
318/162, 235/152
[51] Int. Cl. .................................................. G06f 15/46
[50] Field of Search ........................................ 318/20.108,
20.120, 20.130; 235/151.11, 197

[56] References Cited
UNITED STATES PATENTS

| | | | |
|---|---|---|---|
| 3,128,374 | 4/1964 | Yu Chi Ho et al. ............ | 235/151.11 |
| 3,246,129 | 4/1966 | McKelvie ................... | 318/18(20.120) |
| 3,270,186 | 8/1966 | Centner .................... | 318/162(20.120) |
| 3,325,630 | 6/1967 | Murakami .................... | 235/61.6 |

Primary Examiner—Eugene G. Botz
Attorney—Craig, Antonelli, Stewart & Hill

ABSTRACT: A system for controlling the curve tracing motion of machine tools in which a curve to be traced is divided into a plurality of segments and the curve portion in each segment is approximated by an arc or a straight line so that the curve tracing operation of the machine tool can be controlled by means of pulses distributed with relation to the approximated curve.

PATENTED JAN 12 1971          3,555,253

INVENTOR
SUSUMU SEKI

BY    Paul M. Craig, Jr.
           ATTORNEY

NUMERICAL CONTROL SYSTEM

BACKGROUND OF THE INVENTION

1. Field of the Invention

This invention relates to numerical control systems for the control of machine tools, such as milling machines and lathes, in their cutting or machining operation in tracing a desired curve. More specifically, the present invention relates to a numerical control system of the type in which a curve to be traced is divided into a plurality of segments and the curve portion in each segment is approximated by an arc or a straight line so that the curve tracing operation of machine tools as described above can be controlled by means of pulses distributed with relation to the approximated curve. The present invention is featured by the fact that, in such a numerical control system, means are provided so that the rotating direction of a rotating vector whose initial state is a vector representing the final offset values in the preceding segment of a main curve and which varies or rotates while preserving its length can be controlled in a manner to reduce the inner product value or the scalar value of the outer product of such rotating vector and a vector representing the tangential direction or normal direction of the main curve at its initial point given prior to the tracing operation to zero, and the value of said rotating vector when the inner product value or the scalar value of the outer product is rendered zero is taken as the initial offset values of the succeeding segment, and after suitable correction on the initial conditions pertaining to the main curve, the tracing operation relative to the main curve is started for the proper tracing on a locus offset from the main curve.

2. Description of the Prior Art

In a numerically controlled machine tool, the cutter center must be so controlled as to move on a locus spaced at fixed distances corresponding to the radius of the cutter from a main curve representing the contour of a workpiece. Such predetermined spaced relation of the locus of the cutter center from the contour of a workpiece is generally called offset. More precisely, when it is intended to work a workpiece having a curved contour as shown by a curve $a$ in FIG. 1 by a numerically controlled machine tool, an instruction must be prepared so that the cutter center can trace a locus $b$ offset from the workpiece contour by a distance of the radius $r$ of the cutter.

In such a case it is a common practice to divide a curve to be traced into a plurality of segments so that the curve portion in each segment may be approximated by an arc or a straight line. Therefore in the course of calculation of an offset curve, a method of calculation of the junction point between a curve in one segment and a curve in the succeeding segment is an important problem. However, according to prior practice as, for example, disclosed in Japanese Pat. Publication No. 17895/1962, it has been inevitable that a corrected initial point and terminal point spaced at a distance corresponding to the radius of a cutter from the initial point and terminal point of a segment between the junction points on a main curve must be sought by calculation prior to cutting of the particular segment of a workpiece. The above calculation to seek the corrected initial and terminal points consumes a lot of time when handled by a simple arithmetic unit, while an arithmetic unit of very complex structure is required to effect the calculation in a short time. When, therefore, the calculation on the individual blocks is independently carried out without any overlap in respect of time, a considerable time of break at the junction point between segments is unavoidable in the prior system, while an effort to shorten this considerably long time of break inevitably results in complexity of the arithmetic unit. While it is possible to seek corrected initial and terminal points of a succeeding segment within the time of tracing of the preceding segment, complexity of the arithmetic unit is also unavoidable and in the case where the tracing time of the preceeding segment is shorter than the time consumed for seeking the corrected points the desired purpose is not completely attained.

SUMMARY OF THE INVENTION

It is the primary object of the invention to provide a numerical control system whose operation would not be practically interrupted by the calculation at the above-described junction point and which ensures quickness and continuity of operation during the entire cutting process.

Another object of the present invention is to provide a numerical control system by which the calculation at the junction point between adjacent segments can be simplified, thereby simplifying the arithmetic unit.

A further object of the invention is to provide a numerical control system in which conventionally known means such as a multiplier is employed to simplify the calculation required for the starting of the tracing operation on an offset curve.

Another object of the invention is to provide a numerical control system of simplified structure by virtue of the fact that any need for making corrective calculation on the succeeding segment in overlapped relation within the tracing time for a preceeding block as described above can be eliminated by the extremely shortened time of correcting calculation.

A further object of the invention is to provide a numerical control system in which the amount of offset can be suitably corrected to eliminate the possibility of occurrence of errors.

In order to attain the various objects as described above, the present invention provides a numerical control system of the type wherein a curve to be traced an offset from a main curve is divided into a plurality of segments and the curve o portion in each segment is approximated by an arc or a straight line so that output pulses of the system are distributed with relation to said arc or straight line, characterized by an improvement which comprises means for generating a command signal for tracing a curve offset from a main curve between the initial point and the terminal point of each block of said main curve; said main curve being divided into a plurality of segments so that the curve portion of each said segment can be approximated by an arc or a straight line, means for generating variables (hereinafter to be referred to as offset circular variables) representing the position of a point whose initial position is represented by the final offset values in the preceding segment and which rotates on a circle, means operative, depending on whether the main curve portion in the particular segment is an arc or a straight line, to generate tangential values or normal values representing the tangential direction or the normal direction at the initial point of the main curve portion in said particular segment given prior to the tracing operation, means for calculating the inner product of said offset circular variables and said tangential values or the scalar value of the outer product of said offset circular variables and said normal values, means for controlling the rotating direction of said offset circular variables in a manner to reduce said inner product or said scalar value of the outer product to zero, and means for giving an instruction for the starting of the tracing operation along said offset curve by employing as initial offset values for said particular segment the values of said offset circular variables when said inner product or said scalar value of the outer product is rendered zero.

Additionally, the present invention provides a numerical control system of the type wherein a curve to traced and offset from a main curve is divided into a plurality of segments and the curve portion in each segment is approximated by an arc or a straight line so that output pulses of the system are distributed with relation to said arc or straight line; characterized by an improvement which comprises first means for producing variable signals indicating offset circular variables $(x, y)$ which vary along the circumference of a circle having a center lying on a connection point connecting main curves in two adjacent segments and a radius equal to a distance between the center and a final offset point $(x_o, y_o)$ on the offset curve of first one of the two segments and offset circular pulses $(\Delta x, \Delta y)$ to follow the variables $(x, y)$; second means for calculating an outer produce $S' = xYo - yXo$ between the offset circular variables and coordinates indicating an initial point $(Xo, Yo)$ of the main curve in second one of the two segments, or an inner produce $S = xX + yY$ between the offset circular variables and coordinates (X, Y) on the main curve in second one of the two segments; gate means for controlling the direction of variation of the variable signals; control means for supplying instruction signals (cw, ccw) to the gate means so that the variable signals vary in the direction instructed by the instruction signals so as to make the outer product or the inner product zero; whereby the offset circular variables at the instant when the inner or outer product becomes zero are used as coordinates $(x_i, y_i)$ indicating an initial offset point of the offset curve of the second segment.

DESCRIPTION OF PREFERRED EMBODIMENTS

Figures 1, 2, 11:
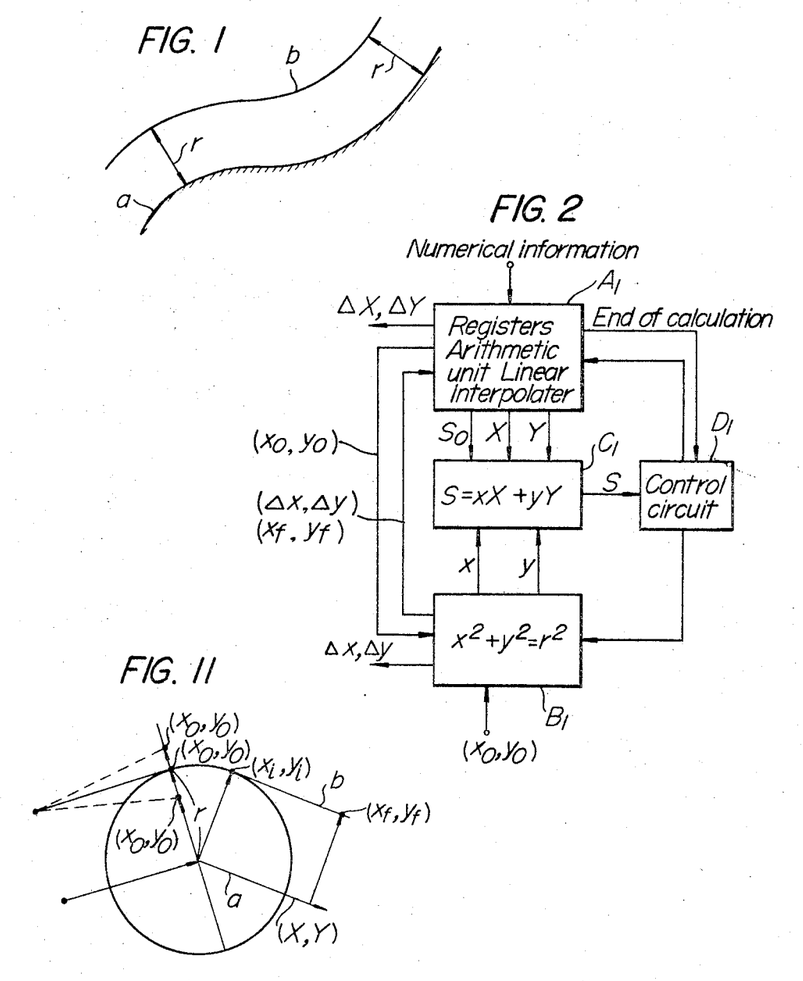
FIG. 1 is a schematic representation of a curve $b$ offset from a main curve $a$ as described previously.
FIG. 2 is a block diagram of one embodiment according to the present invention.
FIGS. 10 and 11 are diagrammatic representations of the principle of operation of the embodiment shown in FIG. 9.

Referring first to FIG. 2 an embodiment of the present invention will be described which is adapted to trace a straight line (X, Y) in a particular segment of a main curve. In FIG. 2, $A_1$ designates means for generating command signals X and Y to trace the main curve representing the contour of a workpiece, and may be provided in the form of any known offset control system capable of tracing a straight line. Upon receiving, from means $B_1$, information relating to initial offset values obtained in a manner as will be described later and under control of a control circuit $D_1$ which provides an instruction to start the tracing operation also in a manner as will be described later, the command signal generating means $A_1$ makes necessary tracing pulse distribution to generate output pulses $\Delta X$ and $\Delta Y$ for tracing a curve offset from the main curve and at the same time sends out the above values of signals X and Y to means $C_1$ which will be also described later. The means $B_1$ is provided to give offset circular variables as defined previously and includes registers for storing therein two variables $x$ and $y$. The above-described offset circular variables $(x, y)$ can be obtained by causing a point defined by $(x, y)$ to vary clockwise or counterclockwise on a circle, $x^2 + y^2 = $ constant, under control of the control circuit $D_1$ and by employing the final offset values of the preceding segment as initial values $x_o$ and $y_o$ of $x$ and $y$. Output pulses $\Delta x$ and $\Delta y$ corresponding to the variation of $x$ and $y$ are sent out from the means $B_1$. The means $C_1$, upon receiving the tracing command signals X and Y and the offset circular variables $(x, y)$ from the respective means $A_1$ and $B_1$, is operative to seek the inner produce product S which is given by $$S = xX + yY \qquad (1)$$

Aand to transmit a corresponding signal to the control circuit $D_1$. The control circuit $D_1$ is operative to control the operation of the means $B_1$ in a manner as described above so as to make the above inner product S to approach zero and to stop the variation of the offset circular variables $(x, y)$ at the moment $S = 0$ is reached. Under such situation the control circuit $D_1$ sends out a tracing instruction to the means $A_1$ to start the tracing of the straight line offset from the main curve, thus, the circuit $D_1$ detects when S is other than zero, transmits the sign of S to means $B_1$, to initiate operation of this control arrangement, and controls operation of the linear interpolator in means $A_1$ in accordance with the value of S.

Figure 3:
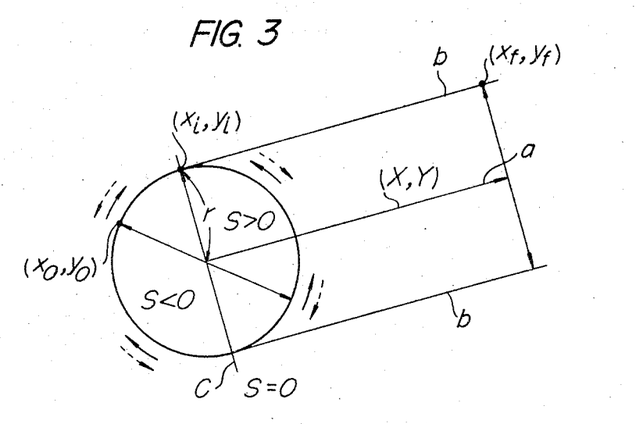
FIG. 3 is a diagrammatic representation of the principle of operation of the embodiment shown in FIG. 2.

First, the final offset values $(x_f', y_f')$ of the preceding segment are supplied to the means $B_1$ so that the final offset values tar are taken as the initial value of the offset circular variables $(x, y)$ and the offset circular variables $(x, y)$ are caused to vary on the circle $x^2 + y^2 = $ constant to send the values $(x, y)$ to the means $C_1$. The means $C_1$ calculates the inner product S as described above, and on the basis of resultant information pertaining to the inner product S, the control circuit $D_1$ controls the direction of variation of the offset circular variables $(x, y)$ in the means $B_1$. In such a case, as shown in FIG. 3, the inner product S has a different signs, depending on whether the offset (which is predetermined) is taken on either side of the main curve $a$.

More precisely, $S > 0$ if the position $(x, y)$ and the vector (X, Y) lie on the same side of a straight line $c$, which is perpendicular with respect to the main curve $a$, $S < 0$ if the position $(x, y)$ and the vector (X, Y) lie on the other side of the line $c$, and $S = 0$ if the position $(x, y)$ lies on the line $c$. Therefore, in the case of a left-hand side offset, the control circuit $D_1$ controls in a manner to cause the offset circular variables $(x, y)$ to vary counterclockwise if $S > 0$ and clockwise if $S < 0$, while in the case of a right-hand side offset, the control circuit $D_1$ controls in a manner to cause the offset circular variables $(x, y)$ to vary clockwise if $S > 0$ and counterclockwise if $S < 0$ so as to establish the relation $S = 0$. Depending on the variation of $x$ and $y$ during the above operation, corresponding output pulses $\Delta x$ and $\Delta y$ are sent out from the means $B_1$. When the relation $S = 0$ is reached, the direction of the vector $(x, y)$ determined by the offset circular variables $(x, y)$ makes right angles with respect to the direction of the straight line (X, Y). At this moment, any variation of the offset circular variables $(x, y)$ is stopped, and values $(x_i, y_i)$ of the offset circular variables $(x, y)$ thus determined are sent into the means $A_1$ and at the same time an instruction for the starting of tracing is supplied from the control circuit $D_1$ to the means $A_1$ with the result that tracing is started with the above values $(x_i, y_i)$ taken as the initial offset values of the particular segment. By holding the above offset values for this particular segment, it is possible to trace the locus $b$ offset from the main curve $a$. Final offset values $(x_f, y_f)$ of this particular segment are employed as initial values $(x_o, y_o)$ of offset circular variables $(x, y)$ for the succeeding segment.

Figure 4:
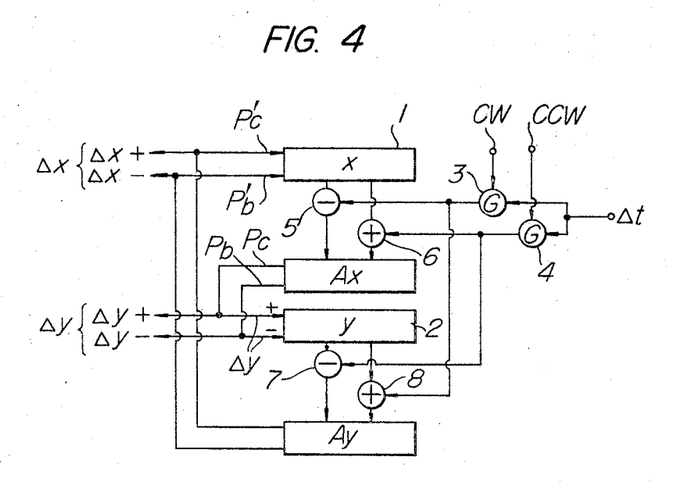
FIGS. 4 and 5 are block diagrams showing the detailed structure of principal parts of the embodiment shown in FIG. 2.

The basic structure of the means $B_1$ and $C_1$ referred to above will next be described. In FIG. 4 there is shown one form of the means $B_1$ which may, for example, have a structure such as is described in "Fundamental Concept of the Digital Differential Analyzer Method of Computation," Spranque, R. E., MTAC6, 1952, January. The means $B_1$ has registers 1 and 2 for storing two variables $x$ and $y$, respectively, as described previously. When an operational signal from the control circuit $D_1$ is applied to a terminal CW in FIG. 4, a pulse $\Delta t$ opens a corresponding gate 3 so that $x$ passing through a − gate 5 is subtracted from an accumulator A$x$, and $y$ passing through a + gate 8 is added to an accumulator A$y$. This operation is repeated for the number of times of arrival of the pulse $\Delta t$ during a period in which the operational signal is applied to the terminal CW. As a result of such accumulation, carry pulses or borrow pulses are produced from the most significant digit of the accumulators. In this case, as will be apparent from FIG. 4, a carry pulse Pc from the accumulator A$x$ adds "1" to the content of the register 2 storing therein $y$ and a borrow pulse Pb from the accumulator A$x$ subtracts "1" from the content of the register 2. Likewise, a carry pulse Pc' from the accumulator A$y$ adds "1" to the content of the register 1, storing therein $x$, and a borrow pulse Pb' subtracts "1" from the content of the register 1. A pulse adding "1" to the register 1 and a pulse subtracting "1" from the register 1 are represented herein by $\Delta x+$ and $\Delta x-$, respectively. Likewise, a pulse adding "1" to the register 2 and a pulse subtracting "1" from the register 2 are represented herein by $\Delta y+$ and $\Delta y-$, respectively. These pulses are derived as outputs $\Delta x$ and $\Delta y$ from the means $B_1$.

Since the repetition rate of carry or borrow pulses produced from each accumulator is proportional to the absolute value of a number repeatedly added or subtracted and the number of times of addition and subtraction, the following relation holds for the variation of the variables $(x, y)$:

$$\frac{dx}{d\tau} \alpha + y, \quad \frac{dy}{d\tau} \alpha - x \qquad (2)$$

From the above relation, it will be seen that the variables $(x, y)$ vary clockwise on a circle expressed by $x^2 + y^2 = x_o^2 + y_o^2$, assuming that initial values of $x$ and $y$ are $x_o$ and $y_o$, respectively. Similarly when the operational signal from the control circuit $D_1$ is applied to a terminal CCW, the following relation holds for the variation of variables $(x, y)$:

$$\frac{dx}{d\tau} \alpha - y, \quad \frac{dy}{d\tau} \alpha + x \qquad (3)$$

In this case, the variables $(x, y)$ vary counterclockwise on the above circle. Therefore, by giving the initial values $x_o$ and $y_o$, it is possible to bind the offset circular variables $x$ and $y$ on the above circle and to vary the variables clockwise or counterclockwise by the operational signal from the control circuit $D_1$.

Figure 5:
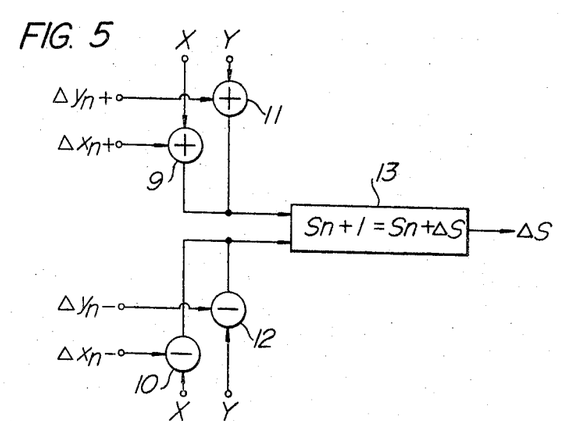

The outputs thus derived from the means $A_1$ and $B_1$ are sent into the means $C_1$. One form of the means $C_1$ is illustrated in FIG. 5. As will be understood from the previous description, the means $C_1$ is a multiplier which calculates the inner product $S = xX + yY$, and in the structure as shown in FIG. 5, the means $C_1$ is adapted to successively seek the value of the inner product $S$ by transforming the equation (1) into the form of the following equation (4):

$$S_{n+1} = S_n + X\Delta_{xn} + Y\Delta_{yn} \qquad (4)$$

where the suffix $n$ represents the state of $S$ after $n$ operations to seek the inner product $S$. In FIG. 5, a pulse $\Delta x+$ from the means $B_1$ opens a +gate 9 to thereby add an output $X$ of the means $A_1$ to an accumulator 13, while a pulse $\Delta x-$ from the means $B_1$ opens a − gate 10 to thereby subtract the output $X$ of the means $A_1$ from the accumulator 13. Similarly, a pulse $\Delta y+$ from the means $B_1$ opens a + gate 11 to thereby add an output $Y$ of the means $A_1$ to the accumulator 13, while a pulse $\Delta y-$ from the means $B_1$ opens a − gate 12 to thereby subtract the output $Y$ of the means $A_1$ from the accumulator 13. In this manner, the inner product $S$ can be successively obtained in this embodiment means $A_2$ is again a conventional offset control system similar to $A_1$ in FIG. 2, means $D_2$ is similar to $D_1$ but provides duplicate circuitry responsive to $S_o'$, and $B_2$ is similar to $B_1$ but provides duplicate circuitry for the function $X'^2 + Y'^2 = $ ².

Figure 6:
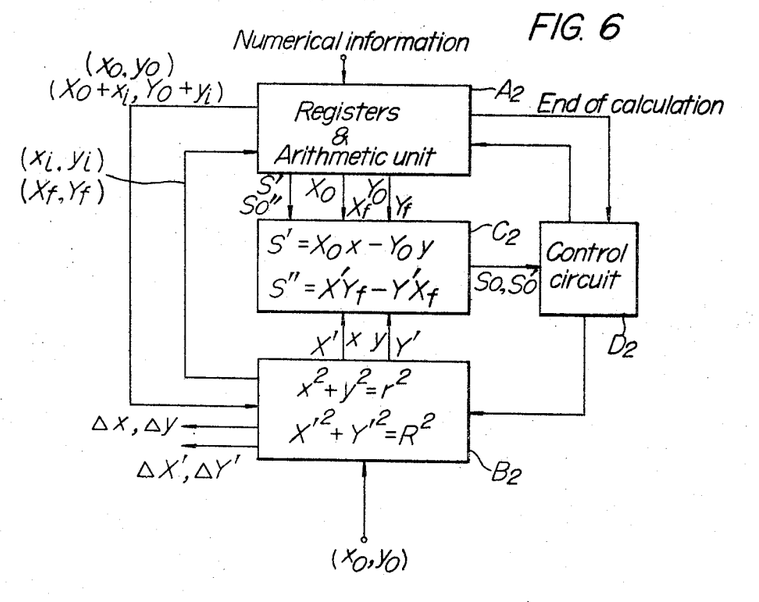
FIG. 6 is a block diagram of another embodiment according to the present invention.
Figure 8:
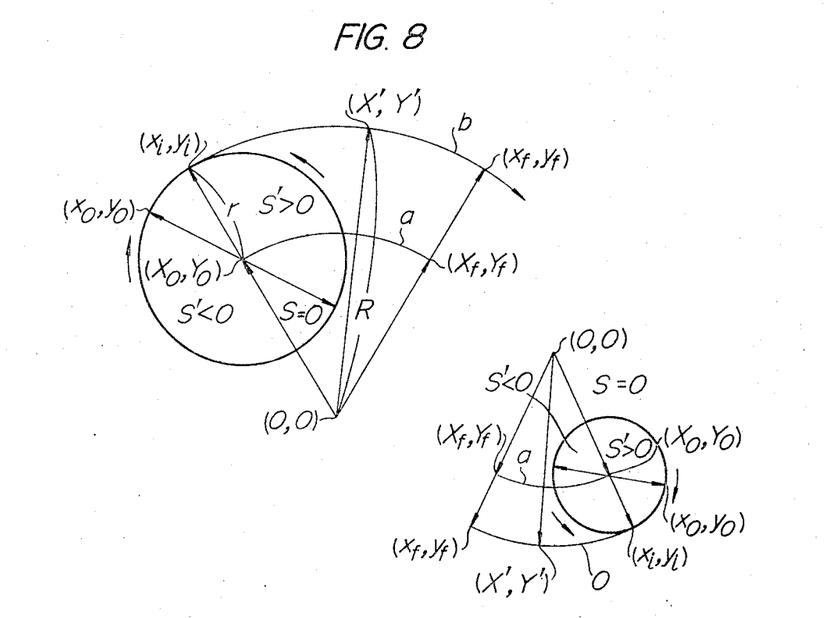
FIG. 8 is a diagrammatic representation of the principle of operation of the embodiment shown in FIG. 6.

Referring now to FIG. 6 another embodiment of the present invention, which is adapted to trace an arc in a particular segment of a main curve, will be described. In case an arc is to be traced, the initial point $(X_o, Y_o)$ and terminal point $(X_f, Y_f)$ of the arc of the main curve about its center $(o, o)$ and a tracing direction depending on clockwise or counterclockwise tracing for the particular arc are first given. Further, as will be apparent from FIG. 8, tracing of an arc must be made in a fashion different from tracing of a straight line in that it is necessary to start the tracing of an offset curve when the direction of a vector $(x, y)$ determined by offset circular variables $(x, y)$ coincides with the direction of a vector of the above initial point $(X_o, Y_o)$, that is, a vector representing the normal direction at the initial point. Accordingly, the scalar value of the outer product $S'$ of these two vectors $$S' = xY_o - yX_o \qquad (5)$$

must be sought.

In the embodiment shown in FIG. 6, means $A_2$ generates signals corresponding to the initial point $(X_o, Y_o)$ and the terminal point $(X_f, Y_f)$ of the main curve and sends these signals into means $C_2$. Further, the means $A_2$ is operative under control of a control circuit $D_2$ to calculate values $(X_o + x_i, Y_o + y_i)$, to send these values into means $B_2$ and at the same time calculate final offset values $(x_f, y_f)$ of the particular segment to store these values therein. The means $B_2$ generates offset circular variables $(x, y)$ varying on a circle, as described previously, to send these variables into the means $C_2$ and delivers output pulses $\Delta X'$ and $\Delta Y'$ corresponding to respective signals $X'$ and $Y'$ for tracing the arc offset from the main curve. The means $C_2$ is operative to seek the above described scalar value of the outer product $S'$ and at the same time calculate a second scalar value of outer product $S''$ $$S'' = X'Y_f - Y'X_f \qquad (6)$$

during the tracing of the arc; to thereby send a corresponding signal to the control circuit $D_2$.

Figure 7:
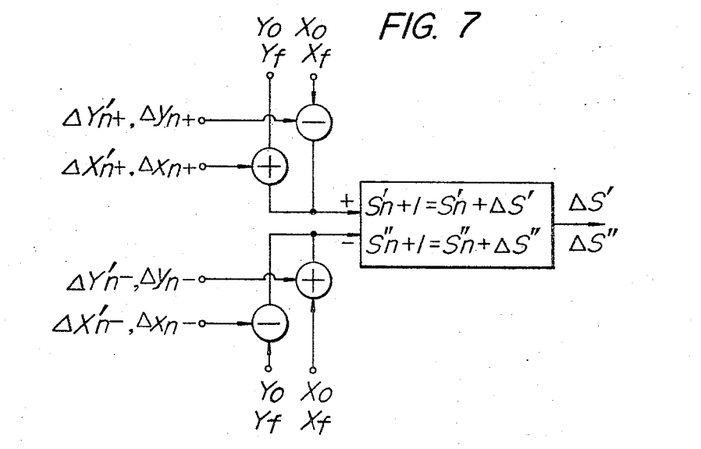
FIG. 7 is a block diagram showing the detailed structure of a principal part of the embodiment shown in FIG. 6.

In FIG. 7 there is shown one form of such means $C_2$. As will be apparent from FIG. 7, the means $C_2$ has a structure substantially similar to that of FIG. 5 and is operative to effect calculation of $$S'_{n+1} = S'_n + \Delta x \cdot Y_o - \Delta y \cdot X_o \qquad (7)$$

and $$S''_{n+1} = S''_n + \Delta X' \cdot Y_f - \Delta Y' \cdot X_f \qquad (8)$$

The control circuit $D_2$ controls the operation of the above means $B_2$ so as to cause the scalar value of the outer product $S'$ to approach zero and is operative to stop the variation of the offset circular variables $(x, y)$ at the moment $S' = 0$ is reached. Under the above situation, the control circuit $D_2$ sends an operational signal into the above means $A_2$ and $B_2$ so as to start the tracing of the offset curve which in this case is an arc.

The operation in this case is as follows:

First, as in the previous case of tracing a straight line, the final offset values $(x_f', y_f')$ of the preceding segment are supplied to the means $B_2$ so that the final offset values are taken as the initial values of the offset circular variables $(x, y)$ which are then sent into the means $C_2$. The means $C_2$ calculates the scalar value of the outer product $S'$ as described above, and depending on the sign of the outer product $S'$ thus calculated, the control circuit $D_2$ controls the direction of variation of the offset circular variables $(x, y)$ in the means $B_2$. The direction control in this case is similar to the case of tracing a straight line as described previously. That is, as shown in FIG. 8, in the case of a left-hand side offset, the control circuit $D_2$ controls in a manner to cause the offset circular variables $(x, y)$ to vary counterclockwise if $S' > 0$ and clockwise if $S' < 0$, while in the case of a right-hand side offset, the control circuit $D_2$ controls in a manner to cause the offset circular variables $(x, y)$ to vary clockwise if $S' > 0$ and counterclockwise if $S' < 0$ so as to establish the relation $S' = 0$. Depending on the variation of $x$ and $y$ during the above operation, corresponding output pulses $\Delta x$ and $\Delta y$ are sent out from the means $B_2$. When the relation $S' = 0$ is reached, the direction of the vector $(x, y)$ determined by the offset circular variables $(x, y)$ coincides with the direction of the vector of the initial point $(X_o, Y_o)$ of the main curve. At this moment, any variation of the offset circular variables $(x, y)$ is stopped and values $(x_i, y_i)$ of the offset circular variables $(x, y)$ thus determined are employed as the initial values of the amount of offset of this particular segment, thereby making necessary correction on the initial conditions of the main curve. By thus correcting the initial conditions and starting the tracing of an offset curve, it is possible to trace the locus $b$ offset from the main curve $a$.

In the embodiment shown in FIG. 6, values $(X_o + x_i, Y_o + Y_i)$ being the sums of the above values $x_i, y_i$ and $X_o, Y_o$ are taken as the initial values, and the means $B_2$ generates signals $X'$ and $Y'$ which vary on an arc, that is, an offset curve $b$ given by $$X'^2 + Y'^2 = R^2 \qquad (9)$$

where $$R = \sqrt{(X_o + x_i)^2 + (Y_o + y_i)^2} \qquad (10)$$

in a direction of rotation determined by the direction of the tracing of the main curve. Depending on the variation of signals X' and Y', corresponding output pulses $\Delta X'$ and $\Delta Y'$ are derived from the means $B_2$. Meanwhile the second scalar value of the outer product S'' described previously is calculated in means $C_2$, and any variation of the values X' and Y' is stopped when the relation $S'' = 0$ is reached. To obtain the final offset values of this particular segment, $x_f = X'_f - X_f$ and $y_f = Y'_f - Y_f$ are calculated and stored for use as initial offset values $(x_o, y_o)$ of the succeeding segment.

From the foregoing description it will be understood that an offset curve consisting of a straight line or an arc can be easily traced by driving a machine tool by output pulses $(\Delta x, \Delta y)$, $(\Delta X, \Delta Y)$ or $(\Delta X', \Delta Y')$ derived in the manner as described above. In the practical numerical control of a machine tool, a main curve $a$ representing the final machined contour of a workpiece may be divided into segments approximated by a plurality of straight lines and arcs as shown in FIG. 10 and the systems as described above may be suitably combined to effect the desired cutting operation.

Figure 9:
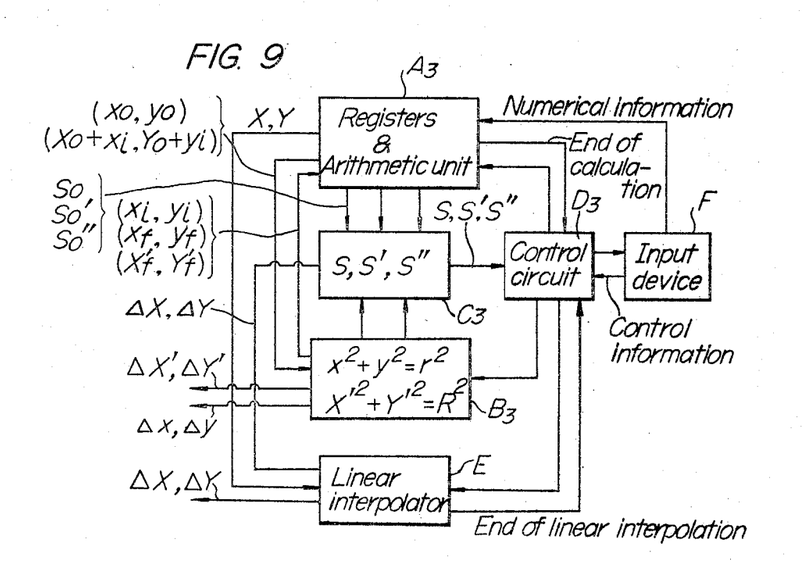
FIG. 9 is a block diagram of a further embodiment according to the present invention.
Figure 10:
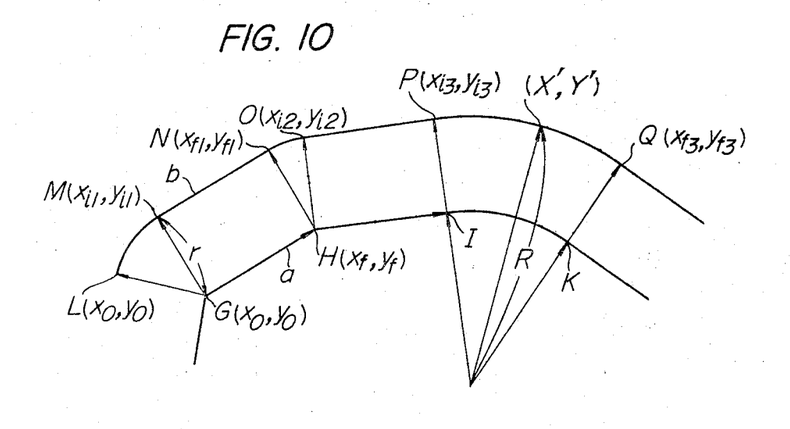

A preferred embodiment adapted to make cutting of the workpiece contour as shown in FIG. 10 is diagrammatically shown in FIG. 9. In FIG. 9, $A_3$ designates means which, upon receiving information from means $D_3$, stores information of the main curve from means F, which may be a tape reader or other information input device, and calculates and stores signals required at the beginning of tracing of individual segments, for example, the initial points of the offset curve and final value of the offset. The means $A_3$ includes a portion of the previously described means $A_1$, that is, that portion of the means $A_1$ which generates arbitrarily fixed values of tracing command signals, and all of the means $A_2$. $B_3$ designates means which generates signals varying on a circle as described previously, while $C_3$ designates means which, upon receiving information from the means $A_3$ and $B_3$, calculates the inner product or the scalar value of the outer product in the manner as described previously. $D_3$ is means which operates both the means $D_1$ and $D_2$ described previously. E represents that portion of the means $A_1$ which generates output pulses $\Delta X$ and $\Delta Y$ for the tracing of a straight line. F designates means, which reads-in, under the command of means $D_3$, the information for the individual segments in accordance with the sequence of cutting steps, sends numerical information to means $A_3$, and sends control information to the means $D_3$.

In FIG. 10 it will be seen that an offset curve $b$, that is, the locus of the cutter center is spaced a cutter radius $r$ from a main curve $a$ representing the contour of a workpiece, and GH, HI and IK are successive segments that should be cut in the first, second and third cutting steps, respectively. L is a starting point of the cutter center at the beginning of the cutting operation. This point L is assumed to have values $(x_0, y_o)$ as described previously to thereby seek initial offset values $(x_{it}, y_{it})$ of the initial point M of the first segment. The cutter is moved from the point L to the point M and cutting operation is started. The offset curve is thereafter traced in the manner as described previously, but at a discontinuous junction point, as shown at H between the first and second segments of the main curve, the offset curve is continuously traced by an arc whose initial values are the final offset values $(x_{fl}, y_{fl})$ of the preceding or first segment. Since the inner product or the scalar value of the outer product is always zero at a continuous junction point as shown at one between the second and third segments, the offset curve corresponding to the succeeding or third segment can be continuously traced for the cutting of the main curve contour.

In this manner of operation, it is probable that a curve as shown by the dotted line in FIG. 11 may be actually traced in lieu of the normal offset curve $b$ due to accumulation of errors during calculation on successive segments. It is therefore desirable to calculate $$D = x_o^2 + y_o^2 - r^2 \text{ or } D = x_f^2 + y_f^2 - r^2 \qquad (11)$$

at the beginning or end of the calculation on a particular segment as required and to correct the existing amount of offset depending on the positive or negative value of D, thereby eliminating any error involved in the amount of offset. For example, after employment of the final offset values of the preceding segment as the initial offset values $(x_o, y_o)$ of a particular block, $D = x_o^2 + y_o^2 - r^2$ may be calculated to obtain $D > 0$ or $D < 0$ depending on the positive or negative value of an error. Upon determining $D > 0$ or $D < 0$, values $(-x_o, -y_o)$ if $D > 0$ or values $(x_o, y_o)$ if $D < 0$, which are equivalent to the command signals (X, Y) in the case of tracing of a straight line, are sent to the means E under command of the means $D_3$. In the means E, pulse distribution is effected in the direction of the vector $(-x_o, -y_o)$ or vector $(x_o, y_o)$ with its output pulses $\Delta X$ and $\Delta Y$ being sent into the means $C_3$ and at the same time the initial offset values $(x_o, y_o)$ are converted into values $(x_o + \Delta X, y_o + \Delta Y)$. Upon receiving the above output pulses $\Delta X$ and $\Delta Y$, the means $C_3$ calculates the above D by a relation

$$D_{n+1} = D_n + 2x_o \cdot \Delta X + 2y_o \cdot \Delta Y \qquad (12)$$

The above pulse distribution at the means E is continued unless there is no change in the sign of D so that the output pulses $\Delta X$ and $\Delta Y$ are delivered therefrom to thereby move the cutter, but the above pulse distribution is ceased when there is a change in the sign of D. It will thus be apparent that proper correction of errors can be effected by the above-described manner of operation. Although the foregoing embodiments have been described as having separate means for the execution of respective functions for convenience of explanation, it will be self-evident for those skilled in the art that means which are not simultaneously operated in respect of time may have a portion thereof used in common so as to more simplify the structure of the system.

It will be appreciated from the foregoing description that the present invention obviates the prior necessity of making troublesome and time-consuming calculation to seek the initial point and the terminal point of an offset curve. By virtue of the fact that, according to the present invention, the only calculation required at the starting of tracing is calculation of the inner product or the scalar value of the outer product, the principle of conventionally known multipliers can be utilized to seek such value and therefore the time required for the calculation can be remarkably shortened. As a result, any necessity for making the calculation in advance can be eliminated and the system structure can be simplified that much. The present invention is further advantageous in that termination of tracing along an arc can be easily identified by the inversion of the sign of the scalar value of the outer product. This advantage renders the system by far simpler than the conventional system in which comparison between coordinates, that is, comparison between coordinates (X, Y) and $(X_f, Y_f)$ must be made.

I claim:

1. A numerical control system comprising means for generating a command signal for tracing a curve offset from a main curve between the initial point and the terminal point of each segment of said main curve, said main curve being divided into a plurality of segments so that the curve portion of each said segment can be approximated by an arc or a straight line, means for generating offset circular variables whose initial offset values in a particular segment are the final offset values in the preceding segment and which vary or rotate on a circle, means operative, depending on the kind of the main curve portion in the particular segment to generate tangential values or a normal values representing the tangential direction or the normal direction at the initial point of the main curve portion in said particular segment given prior to the tracing operation, means for calculating the inner product of said offset circular variables and said tangential values or the scalar value of the outer product of said offset circular variables and said normal values, means for controlling the rotating direction of said offset circular variables on said circle in a manner to reduce said inner product or said scalar value of the outer product to zero, and means for giving an instruction for the starting of tracing operation along said offset curve by employing as initial offset values for said particular segment the values of said offset circular variables when said inner product or said scalar value of the outer product is rendered zero.

2. A numerical control system according to claim 1, having means for stopping the tracing of an offset curve for an arcuate segment of said main curve when the scalar value of the outer product of signals representing the position on said offset curve and normal values representing the normal direction at the terminal point of said main curve is rendered zero.

3. A numerical control system according to claim 1, having means for calculating the difference between the square of the initial offset values or final offset values and the square of the amount of offset in any one of the segments, means for distributing pulses in a positive or negative direction, depending on the sign of the above difference, of the vector of said initial offset values or final offset values, and means for stopping the pulse distribution when the sign of the above difference makes a change due to said pulse distribution.

4. In a numerical control system of the type wherein an offset curve to be traced and offset from a main curve is divided into a plurality of segments and the curve portion in each segment is approximated by an arc or a straight line so that output pulses of the system to follow the offset curve are distributed with relation to said arc or straight line; the improvement which comprises first means for producing variable signals indicating offset circular variables $(x, y)$ which vary along the circumference of a circle having a center lying on a connection point connecting main curves in two adjacent segments and a radius equal to a distance between the center and a final offset point $(x_o, y_o)$ on the offset curve of the first segment and offset circular pulses $(\Delta x, \Delta y)$ to follow the offset circular variables; second means for calculating an outer product $S' = yX_o$ between the offset circular variables $(x, y)$ and coordinates indicating an initial point $(X_o, Y_o)$ of the main curve in the second segment; gate means for controlling the direction of variation of the variable signals; control means for producing instruction signals (CW, ccW) determined in accordance with the outer product $S'$ and for supplying the instruction signals to the gate means so that the variable signals vary in the direction instructed by the instruction signals so as to make the outer product zero; whereby the offset circular variables at the time when the outer product becomes zero are used as coordinates $(Xi, Yi)$ indicating an initial offset point of the offset curve of the second segment.

5. In a numerical control system of the type wherein an offset curve to be traced and offset from a main curve is divided into a plurality of segments and the curve portion in each segment is approximated by an arc or a straight line so that output pulses of the system to follow the offset curve are distributed with relation to said arc or straight line; the improvement which comprises first means for producing variable signals indicating offset circular variables $(x, y)$ which vary along the circumference of a circle having a center lying on a connection point connecting main curves in two adjacent segments and a radius equal to a distance between the center and a final offset point $(x_o, y_o)$ on the offset curve of the first segment and offset circular pulses $(\Delta x, \Delta y)$ to follow the offset circular variables; second means for calculating an inner product $S = xX + yY$ between the offset circular variables $(x, y)$ and coordinates $(X, Y)$ on the main curve in the second segment; gate means for controlling the direction of variation of the variable signals; control means for producing instruction signals (cw, ccw) determined in accordance with the inner product S and for supplying the instruction signals to the gate means so that the variable signals vary in direction instructed by the instruction signals so as to make the inner product zero; whereby the offset circular variables at the time when the inner product becomes zero are used as coordinates $(xi, yi)$ indicating an initial offset point of the offset curve of the second segment.